(12) United States Patent
Hsu et al.

(10) Patent No.: US 6,380,637 B1
(45) Date of Patent: Apr. 30, 2002

(54) OFF-BOARD STATION AND AN ELECTRICITY EXCHANGING SYSTEM SUITABLE FOR USE WITH A MOBILE VEHICLE POWER SYSTEM

(75) Inventors: Michael S. Hsu, Lincoln; Robin Y. P. Ong, Lexington, both of MA (US)

(73) Assignee: Ztek Corporation, Woburn, MA (US)

( * ) Notice: Subject to any disclaimer, the term of this patent is extended or adjusted under 35 U.S.C. 154(b) by 0 days.

(21) Appl. No.: 09/349,567

(22) Filed: Jul. 8, 1999

Related U.S. Application Data

(63) Continuation-in-part of application No. 09/459,404, filed on Jan. 11, 1999, which is a continuation of application No. 08/710,562, filed on Sep. 19, 1996, now Pat. No. 5,858,568.

(51) Int. Cl.[7] .................................. H02P 9/04
(52) U.S. Cl. ..................... 290/1 R; 429/12; 429/13
(58) Field of Search .................. 429/12, 13; 290/1 R, 290/4 R, 4 A

(56) References Cited

U.S. PATENT DOCUMENTS

| | | | |
|---|---|---|---|
| 3,321,334 A | 5/1967 | Palmer | 429/26 |
| 3,441,444 A | 4/1969 | Chesner et al. | 136/86 |
| 3,443,115 A | 5/1969 | Timmerman, Jr. | 307/66 |
| 3,595,699 A | 7/1971 | Baude | 136/86 B |
| 3,677,823 A | 7/1972 | Trocciola | 429/20 |

(List continued on next page.)

FOREIGN PATENT DOCUMENTS

| | | |
|---|---|---|
| DE | 4001684 | 7/1991 |
| DE | 4116899 | 11/1991 |
| EP | 0334474 | 9/1989 |
| EP | 0 755 088 A2 | 1/1997 |
| GB | 2132108 | 8/1984 |
| JP | 59-136006 | 8/1984 |
| JP | 63-002263 | 1/1988 |
| JP | 63-143756 | 6/1988 |

(List continued on next page.)

OTHER PUBLICATIONS

"Fuel Cell Power Source System," Japanese Patent Abstracts, vol. 12, No. 261 (Feb. 1988).

Adcock et al., "Prospects for the Application of Fuel Cells in Electric Vehicles," *Journal of Power Sources*, vol 37, pp. 201–207 (Jan. 1992).

Chi et al., "Air–Cooled PAFC and Ni–Cd Batteries—A Marriage That Works?" *Proceedings of the 23rd Intersociety Energy Conversion Engineering Conference*, vol. 2, pp. 233–238 Jul. 31, 1988–Aug. 5, 1988.

"Fuel Cells for Transportation;" *Advanced Energy Systems, Mechanical Engineering*: Aug. 1989 pp. 74–77.

*Primary Examiner*—Carol Chaney
(74) *Attorney, Agent, or Firm*—Lahive & Cockfield, LLP; Anthony A. Laurentan

(57) ABSTRACT

A mobile vehicle power supply system and an electricity exchanging system enhance the economic viability of different modes of transportation that incorporate generators, such as electric motors and fuel cells, to generate electricity. The power supply system provides for the off-board use of the electric power generated by the generator of a mobile vehicle, such as an electric car. Off-board use, or use remote from the vehicle, of the electrical power includes the delivery of power to a remote site. Off-board stations are provided for delivery of fuel to the vehicle and/or for receiving the electrical power generated by the fuel cell. The off-board station and the vehicle are appropriately equipped for quick and easy interconnection such that electrical power can be exchanged between the vehicle and off-board station and the electricity exchanging system. The electricity exchanging system is configured for installation at numerous locations for allowing a mobile vehicle operator to purchase or sell electricity. The operator employs a user authorization element to assist the recording or tracking of electricity exchanged between the vehicle and the electricity exchanging system.

19 Claims, 8 Drawing Sheets

U.S. PATENT DOCUMENTS

| | | | |
|---|---|---|---|
| 3,843,410 A | 10/1974 | Spahrbier | 136/86 R |
| 3,971,454 A | 7/1976 | Waterbury | 180/65 |
| 4,081,693 A | 3/1978 | Stone | 307/66 |
| 4,277,737 A | 7/1981 | Muller-Werth | 320/2 |
| 4,614,628 A | 9/1986 | Hsu et al. | 264/61 |
| 4,629,537 A | 12/1986 | Hsu | 204/15 |
| 4,713,303 A | 12/1987 | Farooque | 429/26 |
| 4,721,556 A | 1/1988 | Hsu | 204/258 |
| 4,853,100 A | 8/1989 | Hsu | 204/256 |
| 4,931,947 A | 6/1990 | Werth et al. | 364/492 |
| 4,961,151 A | 10/1990 | Early et al. | 364/492 |
| 4,962,462 A | 10/1990 | Fekete | 364/492 |
| 4,988,283 A | 1/1991 | Nagasawa et al. | 429/17 |
| 5,105,142 A | 4/1992 | Takabayashi et al. | 320/3 |
| 5,248,566 A | 9/1993 | Kumar et al. | 429/19 |
| 5,332,630 A | 7/1994 | Hsu | 429/20 |
| 5,470,670 A | 11/1995 | Yasumoto et al. | 429/20 |
| 5,532,573 A | 7/1996 | Brown et al. | 322/22 |
| 5,631,532 A | 5/1997 | Azuma et al. | 320/5 |
| 5,678,647 A | 10/1997 | Wolfe et al. | 180/65.3 |
| 5,693,201 A | 12/1997 | Hsu et al. | 204/241 |
| 5,767,584 A * | 6/1998 | Gore et al. | 290/1 R |
| 6,107,691 A * | 8/2000 | Gore et al. | 290/1 R |
| 6,158,537 A * | 12/2000 | Nonobe | 180/65.3 |

FOREIGN PATENT DOCUMENTS

| | | |
|---|---|---|
| JP | 01-166470 | 6/1989 |
| JP | 01-320773 | 12/1989 |
| WO | WO93/09572 | 5/1993 |
| WO | WO 98/12763 | 3/1998 |

* cited by examiner

OFF-BOARD STATION AND AN ELECTRICITY EXCHANGING SYSTEM SUITABLE FOR USE WITH A MOBILE VEHICLE POWER SYSTEM

This application is a C-I-P of Ser. No. 09/459,404 filed Jan. 11, 1999 which is a continuation of Ser. No. 08/710,562 filed Sep. 19, 1996 U.S. Pat. No. 5,858,568.

BACKGROUND OF THE INVENTION

The invention relates generally to the field of propulsion systems. In particular, the invention concerns an on-board fuel cell system for mobile vehicles such as trains, marine vessels, automobiles, motorcycles, motorbikes, and other mobile means of transportation.

As concerns surrounding traditional power sources persist, investigation into alternative means of power generation are becoming increasingly important. In particular, environmental and political concerns associated with combustion-based energy systems cannot be ignored. In an effort to reduce dependence on these types of power supplies and methods, an ever increasing interest has arisen in devices capable of generating electricity by consuming fuels without requiring combustion.

In addition to being utilized for the generation of electricity, however, combustion processes are most commonly used to power means of transportation such automobiles, trains, or marine vessels. Motor vehicles alone are among the chief contributors to pollution problems associated with combustion of fuel. Hence, while alternative power sources such as nuclear and hydroelectric systems may be suitable for large scale electric utilities, they do not present an ideal solution to the problems associated with powering means of transportation such as motor vehicles.

Alternatives to internal combustion engine powered motor vehicles have included various types of electric vehicles. Electric vehicles are well known in the art. Typical electric vehicles are powered by nickel-cadmium batteries which drive electric motors of anywhere from twenty to 100 horsepower. The batteries are generally rechargeable by stationary direct-current (dc) power supplies. A problem with known systems, however, is that they require constant recharging and offer limited range between required recharging stops.

Known systems are also expensive. Solar rechargeable systems, such as are available from Solectria of Arlington, Massachusetts, represent one attempt to increase the travel range and control the cost of electric motor vehicles. Drawbacks associated with the solar generation of electricity, however, include its usefulness being limited to clear weather and daylight hours, and the expense of the vehicle.

Fuel cells, therefore, have been explored as a means for powering electric vehicles and reducing the constant need to recharge the vehicle from off-board sources. Fuel cells electrochemically convert fuel, such as hydrocarbon fuel, to electricity. Typically, a combustion reaction is not involved.

A drawback associated with prior art fuel cell systems, however, is that they are not economically viable for applications in which the power rating of the fuel cell must meet propulsion demands. In motor vehicle applications, for example, a fuel cell system designed to provide sufficient power required by the vehicle for cruising, let alone for peak surge, would be prohibitively expensive. While various known systems have attempted to exploit the advantages of designating a surge battery to meet peak demand in motor vehicle applications, none has satisfactorily overcome the economic problems.

Another general problem that has assisted in preventing the widespread implementation of electric vehicles is the restrictions on vehicle range created by the finite charge of the vehicle battery. Currently, selected dedicated charging stations do not exist that allow an operator of the electric vehicle to stop and exchange energy therewith on an as needed basis.

It is thus an object of the invention to provide a system which has a range comparable with that of traditional combustion engines without requiring excessively frequent stops, and interruptive recharging from off-board sources.

It is another object of the invention to provide an economically feasible system for powering a motor vehicle which can accommodate typical motor vehicle surge and range demands.

It is yet another object of the invention to provide a fuel-cell powered vehicle that is capable of generating power for off-board consumption.

It is still another object of the invention to provide an electricity exchanging system for enabling the off-board supply of power from the vehicle to the system, or enabling the on-board loading or receiving of power from the system.

Other general and more specific objects of the invention will in part be obvious and will in part appear from the drawings and description which follow.

SUMMARY OF THE INVENTION

The present invention relates to a power supply system that enhances the economic viability of certain modes of transportation that incorporate fuel cells to generate electricity. Such modes of transportation are referred to herein as mobile vehicle fuel cell power systems, where vehicle, as used herein, refers to all means of transportation, for example, automobiles, electric vehicles, trucks, trains, marine vessels, airplanes and spacecraft, and other vehicles employing a power source to transport one or more people. For example, the power supply system of the present invention provides for the off-board use of the electric power generated by the on-board fuel cell of a mobile vehicle fuel cell power system, such as the fuel cell mounted in an electric car. Off-board use, or use remote from the vehicle, of the electrical power can include delivery of power to a remote site, such as a local residence, for example, the residence of the owner of the vehicle, or to a local utility power grid, or to another mobile vehicle.

The present invention also contemplates the use of a mobile vehicle power system that includes all known and compatible types of mobile vehicles or transportation, such as automobiles, electric vehicles, trucks, trains, marine vessels, airplanes, spacecraft and the like. The mobile vehicle power system employs a power source or generator for converting fuel to electricity. The term generator as used herein is intended to include general types of power sources for supplying energy to a mobile vehicle, such as a diesel engine, fuel cell, internal and external combustion engines, electric motor or generator, battery, and solar cells, as well as gas and steam turbines of micro and macro sizes. The integration of fuel cells with a gas turbine, including both micro and macro gas turbines, is clearly set forth in U.S. Pat. No. 5,693,201, to the assignee hereof, the contents of which are herein incorporated by reference.

Off-board stations are provided for delivery of fuel to the vehicle and for receiving the electrical power generated by the fuel cell, and for supplying electricity off-board of or loading or receiving electricity onto the electric vehicle. The off-board station and the vehicle are appropriately equipped for quick and easy interconnection such that electrical power is drawn from the fuel cell for off-board use. In addition, the off-board station can be equipped to deliver fuel to the vehicle, with similar provisions for the quick interconnection of the vehicle and the off-board station. Vehicles can be considered mobile fuel cell systems that deliver power for off-board use when power from the fuel cells is not required for on-board uses, such as propelling the vehicle. Fuel cells may be incorporated into mobile vehicles in a number of ways. For example, fuel cells can be used in tandem with a gas turbine to propel a vehicle, such as a marine vessel or a train.

The on-board use of the fuel cell need not be limited to, or even involve, propelling the vehicle or vessel. Fuel cells can be used to provide heating, ventilation and air conditioning (HVAC) systems independently of or used in connection with the mobile vehicle power system. For example, a marine vessel can use an on-board fuel cell for on-board HVAC and for the provision of on-board electrical power; off-board uses can include the delivery of electrical power to an off-board station when the vessel is in port.

According to another aspect, the invention can employ from one to many off-board stations. For example, the owner or principal user of an electric vehicle can have an off-board station located near a primary residence. Alternatively, off-board stations can be provided at locations where electric vehicles are typically parked for an extended period of time, such as homes, shopping malls, parking lots and places of employment. The off-board station can be electrically connected through power cables to a utility grid, to transmit a portion of the electrical power produced by the on-board fuel cell to a remote site for use. Conductive power cables, however, are not the only carriers for the high efficiency transmission of electrical power; such transmission has been demonstrated over free space using microwaves. Whatever the means of power transmission, the dual use of the vehicle fuel cell power plants, that is, use wherein the fuel cell supplies power for both on-board and off-board purposes, is intended to enhance the economic viability of mobile vehicle fuel cell power systems, promote the use of alternative power sources, and realize the attendant environmental benefits.

In another aspect, the invention comprises a power supply system for converting fuel to electricity, where the power supply system includes a mobile vehicle fuel cell power system and an off-board station. The mobile vehicle fuel cell power system optionally includes a rechargeable battery; a fuel cell for converting fuel to electricity and for recharging the battery; optionally a fuel supply for storing and providing fuel to the fuel cell; and apparatus for electrical connection to the off-board station for delivering to the off-board station the electricity generated by the fuel cell. The mobile vehicle fuel cell power system can also include apparatus for receiving fuel from the off-board station.

The off-board station typically includes apparatus for receiving electrical power from the mobile vehicle fuel cell power system and output apparatus for providing at least a portion of the electrical power for use off-board of the mobile vehicle fuel cell power system. The receiving apparatus can optionally include electrical cables and/or receptacles for mating with cables. The output apparatus can optionally include a relay and/or a switch for electrical connection to an off-board site. A simple off-board station can comprise, for example, a receptacle for electrically coupling with a cable connected to the mobile vehicle, and some electrical wiring attached to the receptacle for transmitting electrical power for off-board use. The off-board station can also include apparatus for delivering fuel to the mobile vehicle fuel cell power system.

In one instance, the fuel supplied by the off-board station and received by the mobile vehicle fuel cell is a hydrogen-containing fuel. However, the fuel can be a hydrocarbon fuel, in which case a fuel reformer, and perhaps a fuel shifter, are included on-board the vehicle for producing a hydrogen-containing fuel. Alternatively, a fuel reformer, and perhaps a fuel shifter, are part of the off-board station. In the latter case the off-board station can include a fuel storage tank for storing reformed fuel. Furthermore, hydrocarbon fuels often contain sulfur. Sulfur in significant quantities causes corrosion of the fuel cell and can destroy certain catalysts of the reformer and the fuel cell electrodes, as well as contributes to air pollution and acid rain when discharged into the air. Accordingly, a desulfurization unit can optionally be incorporated in the present invention to remove sulfur from the fuel prior to the delivery of the fuel to the reformer. The desulfurization unit can form part of, according to one aspect, either the off-board station or the mobile vehicle fuel cell power system.

Typical reactants for aiding the fuel reformation process are known in the art. Accordingly, in another feature of the invention, a reactant such as water is supplied to the reformer, whether located on-board the vehicle or at the off-board station, to aid in the reformation process. If the reformer is mounted on-board the mobile vehicle, appropriate means are employed for supplying water to the vehicle. For example, water is supplied to the off-board station, and appropriate ports are provided at the station and on the vehicle, to accommodate a quick-connect hose connected therebetween. The power system of the present invention can include apparatus to filter and/or de-ionize the water, if such treatment is necessary. Note, however, that a reformer can be designed to simply utilize an oxidizer (e.g. air) instead of a reactant such as water. Use of a reformer, either on-board of off-board the mobile vehicle, need not require incorporation of means to deliver a reactant such as water to the reformer.

According to another aspect of the invention, meters are incorporated into the power supply system for metering, for example, the fuel received by the electric vehicle from the off-board station. Similarly, an electric meter can be also be used to measure the electrical energy or power delivered from the vehicle to the off-board site or from the off-board site to another location, e.g. the power grid or a local residence, for use remote to the vehicle.

A typical fuel cell produces direct current electrical power; a typical residence or utility power grid employs alternating-current electrical power. Accordingly, in one aspect of the invention, the off-board station includes an inverter or inverters for converting the direct-current electrical energy produced by the vehicle fuel cell to single-phase or multi-phase electrical power. A typical utility power grid transmits three-phase electrical power, and thus an off-board station, if supplying power to the grid, converts fuel cell electric power to three-phase alternating current. Alternatively, the inverter or inverters can be located on the mobile vehicle fuel cell power system to provide alternating current for off-board and/or off-board use. For example, if the mobile vehicle fuel cell power system is a train or a supertanker, the inverters can be located thereon. Of course, if direct current is desired for use remote to the vehicle, the off-board station need not employ an inverter for converting direct-current to alternating-current. The type of electric power meter employed in the power system depends on whether direct current or alternating current power is to be measured.

In yet another aspect, the off-board station includes a two-way or one-way telecommunications link to report condition parameters of the station, and perhaps of the electric vehicle, to another location. Condition parameters can include, but are not limited to, the quantity of fuel delivered to a vehicle, the amount of electricity supplied by the fuel cell of the vehicle for use remote to the vehicle, the identity of the vehicle or of the owner of the vehicle, and other usable parameters. The communications link can also transmit to the off-board station and/or the vehicle instructions for execution.

Many types of fuel cells are known to those of ordinary skill in the art to be useful in with electric vehicles. Accordingly, it is deemed within the scope of the invention to use several types of fuel cells, including but not limited to, solid oxide fuel cells, molten carbonate fuel cells, phosphoric acid fuel cells, alkaline fuel cells, and proton exchange membrane fuel cells.

The power system of the present invention envisions the off-board use of electrical power generated on-board the mobile vehicle via the interconnection of the mobile vehicle power system with an off-board station. However, the practice of the invention need not involve the use of an off-board station exactly in the manner described above. For example, a mobile vehicle fuel cell power system may be electrically connected to a second mobile vehicle electrical power system, such as another electrical vehicle, to recharge the batteries of the other vehicle. In this instance, the vehicle whose batteries are being recharged serves as a type of off-board station. The vehicles are appropriately equipped for quick and convenient interconnection. Both can include apparatus, such as male electrical receptacles, for coupling with the female connectors of a power cable connected between the fuel cell mobile vehicle power system and the second mobile power system for transferring electrical power therebetween. As both vehicles operate on dc power, an inverter is not always necessary. Note that the second mobile power system can be a fuel cell vehicle or a conventional (e.g., non-fuel cell) electric vehicle.

According to another aspect, the power system of the present invention is also deemed to include vehicles that do not employ fuel cells. For example, a mobile vehicle power system according to the teachings of the present invention can use traditional power plants, such as a combustion engine, an electrical generator, a battery, steam or gas turbines or generators and other power forms, such as solar power. The generator converts the mechanical energy of the combustion engine to electrical energy for on-board use, off-board use, and/or for storage by the battery. When the vehicle is coupled to an off-board station, the power plant delivers electricity to the off-board station for use off-board the vehicle and optionally receives fuel from the off-board station. The combustion engine can be an internal combustion engine, for example a diesel or gasoline engine, or an external combustion engine, such as a steam engine or a sterling engine. The mobile vehicle power system can include an electric motor for propelling the vehicle, as is typical in a diesel-electric train engine, or the combustion engine may propel the vehicle directly, as is typical in conventional automobiles.

The present invention also provides for an interface electricity exchanging system suitable for exchanging electricity with an electric powered vehicle. The system includes an interface housing having electrical coupling means for coupling to an electrical connection of the electric powered vehicle, a recording stage for recording the amount of electricity exchanged between the vehicle and the housing, and a converter for converting the amount of recorded electricity into a monetary value according to a predetermined conversion factor. The claimed system optionally can also includes structure formed in the housing for receiving a portable memory element having a selected alterable monetary value stored thereon, and an alteration stage for altering the monetary value stored on the portable memory element by an amount related to the value of the electricity exchanged between the facility and the vehicle.

According to one aspect, the electricity exchanging system includes a coupling element for coupling the housing to an electric vehicle. According to one practice, the vehicle mounts a fuel cell, a battery, or a combustion engine.

According to another aspect, the electricity exchanging system includes a receiving element means for receiving electricity from the electric powered vehicle, or structure for supplying electricity to the electric powered vehicle.

According to still other aspects, the electricity exchanging system employs structure for decrementing a monetary value stored on the portable memory device in an amount related to an amount of electricity supplied to the electric powered vehicle. The electricity exchanging system can also employ structure for incrementing a monetary value stored on the portable memory device in an amount related to an amount of electricity supplied to the system by the electric powered vehicle.

Other general and more specific objects of the invention will in part be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
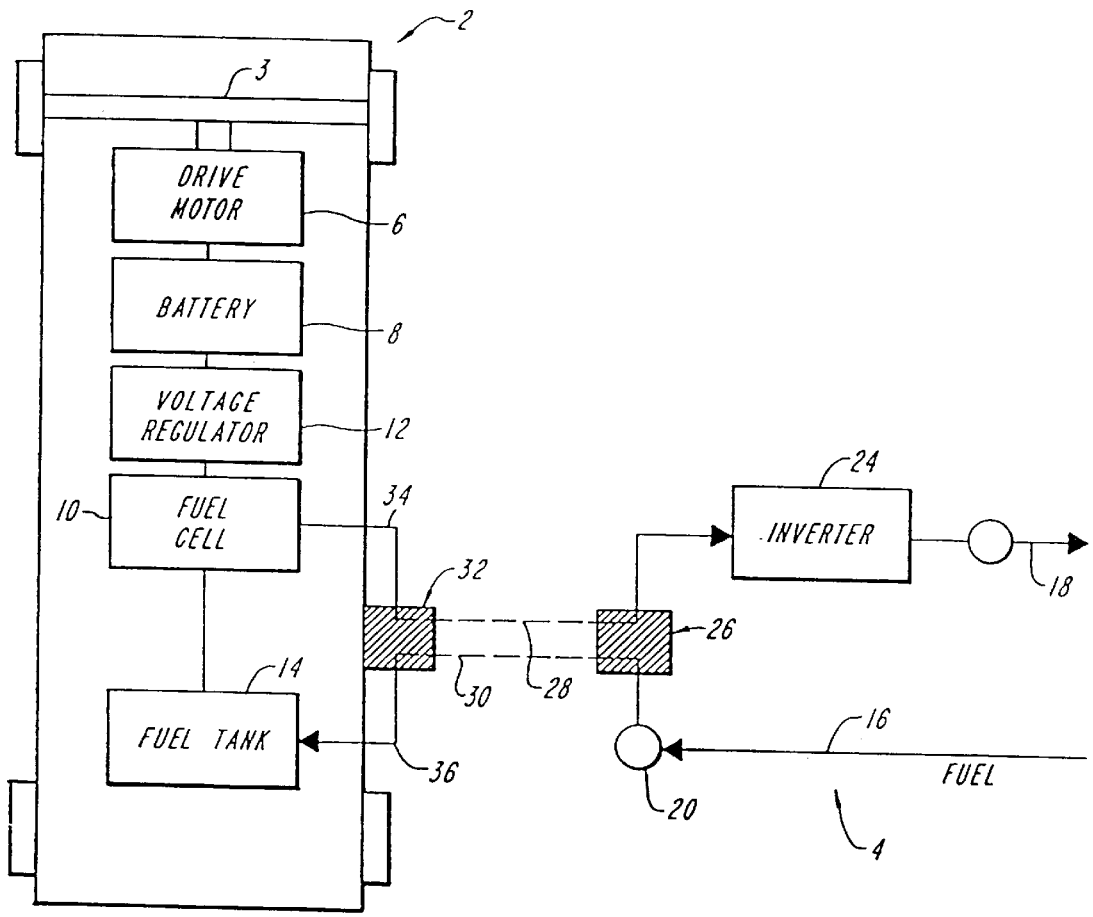
FIG. 1 is a block diagram of a power supply system according to the invention, illustrating a vehicle that includes an on-board fuel cell power plant and further including an off-board station for connection to the vehicle.

FIG. 1 is a block diagram of a power supply system according to the present invention, illustrating a mobile vehicle power system, such as an electric vehicle 2, and an off-board power station 4. The mobile vehicle power system 2 includes, according to one embodiment, a fuel cell assembly 10 which is electrically connected to a rechargeable battery 8. The battery 8 is connected to an electric or drive motor 6 which drives a motor vehicle drive train 3. The fuel cell assembly 10 receives fuel such as, for example, natural gas, from a fuel supply tank 14 and electrochemically converts it to electricity, as is known in the art, to recharge the battery 12. A voltage regulator 12 is arranged between the fuel cell assembly 10 and the battery 8. The foregoing circuitry is known to those skilled in the art of motor vehicles in general and electrically powered motor vehicles in particular.

The illustrated fuel cell assembly 10 does not necessarily directly provide power to the electric motor 6. Rather, the fuel cell assembly 10, the battery 8, and the electric motor 6 act together to power the vehicle. The fuel cell assembly 10, under steady operation, can be utilized for on-board recharging of the battery 8. The battery 8 is typically under a variable load demand, depending on the terrain, the speed of the vehicle, the driving requirements and environment, etc. The fuel cell assembly 10 is electrically connected to the voltage regulator 12, which is in turn electrically connected to the battery 8 to transfer recharging electrical energy from the fuel cell assembly 10 to the battery 8.

The fuel cell assembly 10 can comprise, for example, a solid oxide fuel cell. A solid oxide fuel cell is an electrochemical converter which employs solid oxide electrolytes. Such converters are capable of high efficiencies, depending only on the relation between the free energy and enthalpy of the electrochemical reaction. An example of a solid oxide fuel cell is described in U.S. Pat. No. 4,614,628, issued Sep. 30, 1986 to Hsu et al, the teachings of which are hereby incorporated by reference.

Alternatively, an on-board fuel cell assembly 10 that uses hydrogen as a fuel, or an on-board fuel cell that is capable of internal reforming and that consumes a hydrocarbon fuel, can be installed in the vehicle 2. Other types of fuel cells known to those of ordinary skill in the art and suitable for use in the mobile vehicle power system include molten carbonate fuel cells, phosphoric acid fuel cells, alkaline fuel cells and proton exchange membrane fuel cells. Additional details on electric vehicles and fuel cells for incorporation therein can be found in U.S. Pat. No. 5,332,630, issued Jul. 26, 1994 to Hsu, and which is herein incorporated by reference.

With reference to FIG. 1, the off-board station 4 includes a fuel supply conduit or line 16 for supplying fuel from a fuel source (not shown) to the vehicle 2, and a power transmission line 18 for receiving and transferring electric power generated by the fuel cell 10 for direct use at a residence or other facility, or for provision to an electric power grid. The fuel meter 20 meters, measures or records the amount of fuel delivered by the off-board station 4 to the fuel tank 14 of the vehicle 2. The electric power meter 22 measures the amount of electricity delivered by the vehicle for off-board use.

The station 4 can further include an inverter 24 for conversion of the direct current electrical power typically generated by the fuel cell 10 to single phase, or if necessary multi-phase, alternating current typically compatible with the electric power grid.

Figure 4:
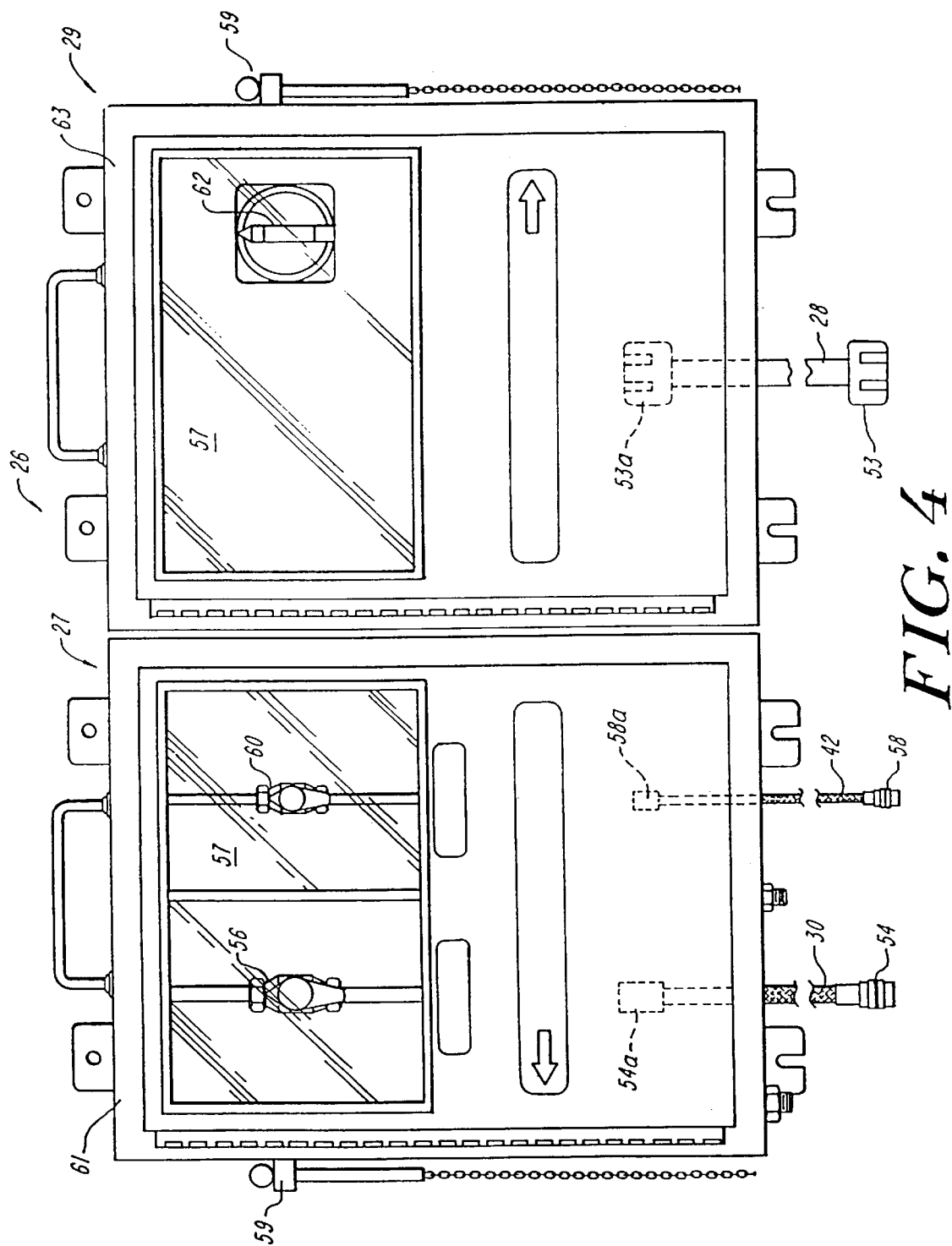
FIG. 4 is an illustration of the access panel of an off-board station for quick attachment of fuel and power lines to a mobile vehicle fuel cell power system.

Power and fuel are transferred between the vehicle 2 and the off-board station 4 by an electrical power transmission line 28 and a fuel conduit or line 30, respectively. The power line 28 and the fuel line 30 interconnect the vehicle 2 and the off-board station 4 via the vehicle access panel 32 and the off-board station access panel 26. The access panel 26 of the off-board station and the access panel 32 of the vehicle 2 each comprise two access sub-panels—a fuel sub-panel for accommodating the fuel line 30 and an electrical sub-panel for accommodating the electrical power line 28, as is described in more detail in relation to FIG. 4. The fuel sub-panel 27 of the off-board access panel 26, FIG. 4, is separate from the electrical sub-panel 29 in FIG. 4 to avoid the risk of explosion due to stray sparks igniting fuel. The vehicle access panel 26 is similar to the off-board station access panel 26 depicted in FIG. 4.

A power line 34 electrically connects the electrical access panel of vehicle access panel 32 to the fuel cell 10; the fuel sub-panel of access panel 32 is connected to the fuel tank 14 by a fuel line 36. The off-board station access panel 26 is similarly connected to the power line 18 and the fuel line 16.

Lines 30 and 28 are preferably of the quick interconnect type, such that a driver of the electric vehicle, upon parking the vehicle, can easily and quickly interconnect the vehicle access panel 32 with the off-board access panel 26. Many types and variation of the lines 28 and 30 are known to those of ordinary skill in the art. For example, the lines 28 and 30 can have male connectors on each end, and the access panels 26 and 32, can be equipped with mating female receptacles. Alternatively, the lines 28 and 30 can be permanently attached at one end to the access panels 26 or 32 and connect via connectors to the other access panel. Many variations are possible, as is readily appreciated by those of ordinary skill in the art. Typically, however, a cable for the transmission of electrical power will not have male connectors on an end, as this could expose a user of the cable to dangerous voltages and/or currents.

Figure 2:
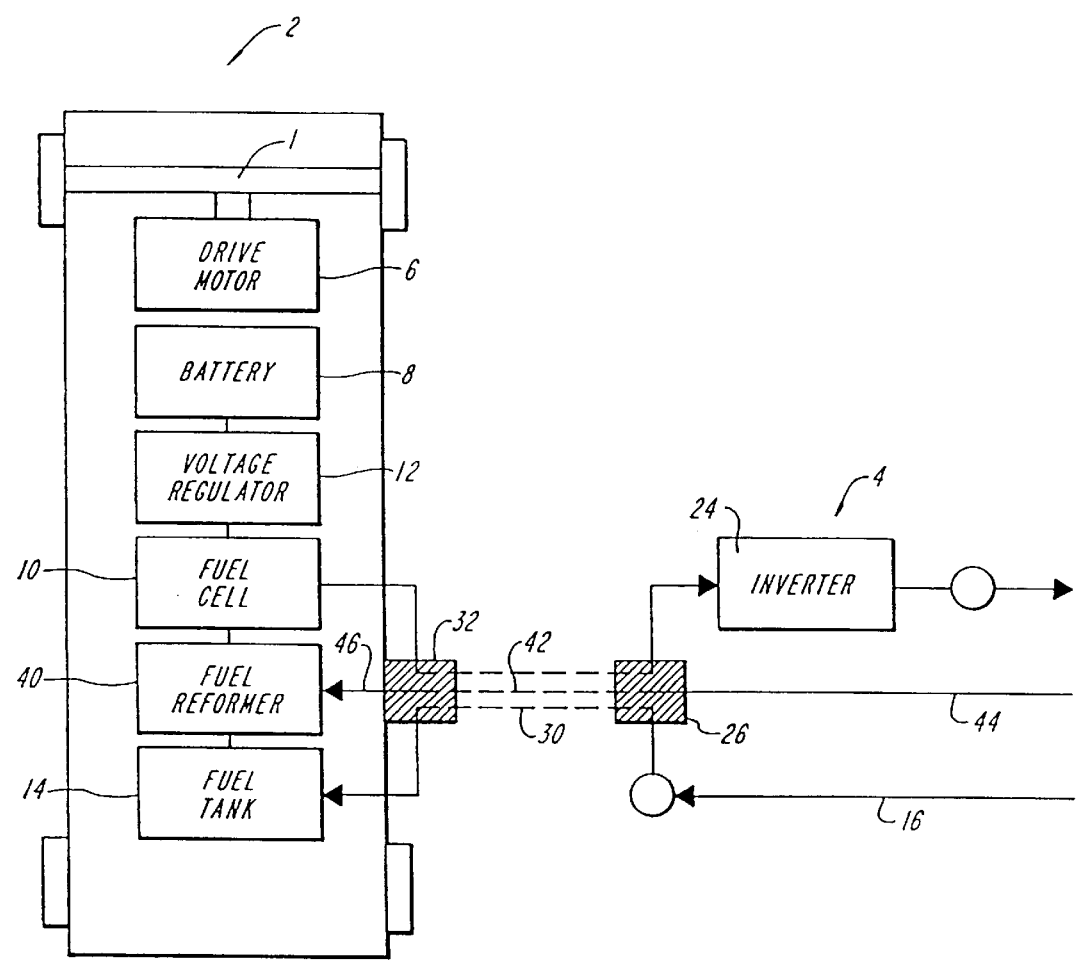
FIG. 2 is a block diagram of an alternate embodiment of the power supply system that includes a fuel reformer on-board the electric vehicle according to the teachings of the present invention.

FIG. 2 is a block diagram of a power supply system that includes an on-board fuel reformer 40 that is connected between the fuel tank 14 and the fuel cell 10. The reformer produces, from a hydrocarbon fuel, a hydrogen-containing or hydrogen-rich reformed fuel for the fuel cell. A fuel shifter (not shown) can also be included in a series connection with the fuel reformer 40 to assist in the formation of hydrogen-rich fuel. The fuel shifter is typically filled with a shift catalyst that converts carbon monoxide present in the fuel stream into carbon dioxide, producing fuel stock rich in hydrogen. The removal of carbon monoxide from the fuel stream is essential to prevent carbon monoxide poisoning of certain fuel cells. The fuel mixture exiting the shift converter is thus rich in carbon dioxide and hydrogen An additional interconnection line 42 can be used between the vehicle access panel 32 and the off-board station panel 26 to provide appropriate reactant (e.g., water) for the reformer 40 to facilitate the reformation process. According to one practice, the water line 44 provides water to the station access panel 26 and the line 46 transfers the water from the vehicle access panel 32 to the fuel reformer 40. The fuel lines 16 and 30 supply a hydrocarbon fuel for reformation by the reformer 40.

Figure 3:
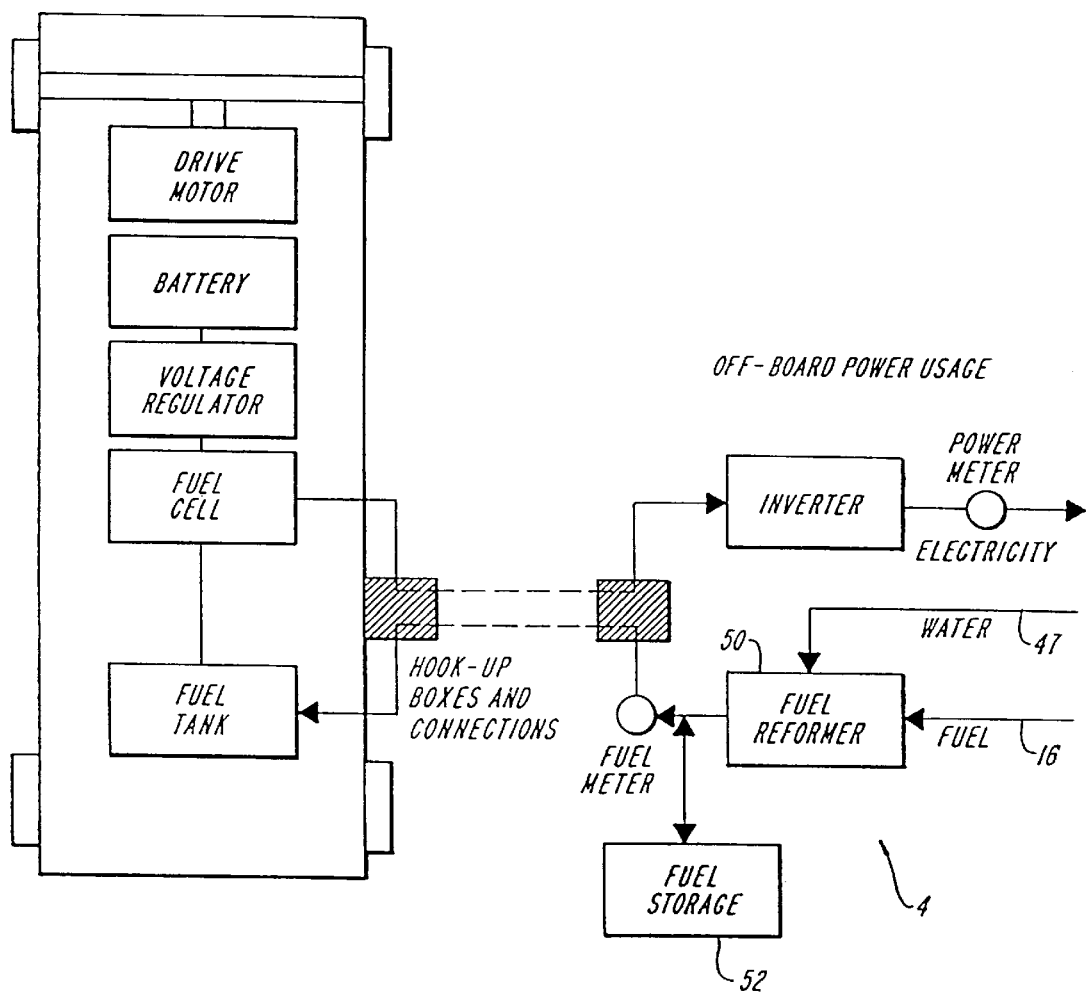
FIG. 3 is a block diagram of another embodiment of the power supply system wherein the off-board station includes a fuel reformer and a fuel storage tank.

FIG. 3 is a block diagram of an alternate embodiment of the power supply system in which the off-board station 4, rather than the vehicle 2, includes the fuel reformer 50, and, optionally, a fuel storage tank 52. The off-board station 4 receives a hydrocarbon fuel from the fuel line 16. The fuel reformer 50 converts the hydrocarbon fuel supplied from the fuel line 16 to a hydrogen-containing fuel that is stored in the fuel storage tank 52 and/or supplied to the mobile vehicle fuel cell power system for use by the fuel cell 10. The off-board station 4 can optionally include a fuel shifter (not shown) for increasing the hydrogen content of the reformed fuel produced by the fuel reformer 50. The hydrogen rich fuel produced by the fuel shifter is then available for storage in the fuel storage tank 52 or for supply to the mobile vehicle fuel cell power supply system 2. The off-board station 4 can also include a water line 48 for delivering water received from a water source (not shown) to the fuel reformer for use in the fuel reformation process. In the systems illustrated in FIGS. 2 and 3, thermal-electric or other means can be employed to prevent freezing of the water used for reformation.

As discussed previously, the power system of the present invention can include de-ionization and filtering equipment for the water reactant, as well as desulfurization equipment for the hydrocarbon fuel.

FIG. 4 illustrates one example of the mobile power plant 32 or the off-board station access panels 26 according to the present invention. Those of ordinary skill will appreciate that other embodiments of the access panels 26, 32 exist to effectuate the coupling of the vehicle 2 to the off-board station 4. The embodiment shown in FIG. 4 is therefore illustrative and not limiting.

The panels 26, 32 illustrated in FIG. 4, for example, can comprise two separate sub-panels, a gas and water sub-panel 27 and an electrical sub-panel 29. Attached to the gas and water sub-panel 27 is a fuel gas supply hose 30 having quick disconnect, 1 inch tube female connectors, such as connector 54, on each end of hose 30. The end of hose 30 shown in phantom with female connector 54a in FIG. 4 mates with an auto-close male connector (not shown) mounted on the access panel 27 internal to housing box 61. A fuel shut off valve 56 is also provided. Similarly, the water supply hose 42 employs quick disconnect, ¼ inch tube auto-close female connectors 58 and 58a, and a shut-off valve 60. The electrical switch 62 is mounted in electrical sub-panel 29 and can be a single position safety manual lever 3-phase switch for electrical connection of the off-board station to, for example, the local utility power grid. The electrical power cable 28 has two female connectors, such as connector 53, on each end of the cable 28. The electrical connector 53 mates with a male connector of panel 32 (not shown) of the vehicle 2. The other end of the electrical cable 28 shown in phantom with connector 53a, connects to a male connector (not shown) of electrical access panel 29, and housed inside the box 63, to be described below.

Flexible interconnecting hoses and cables, such as the hoses and cables 28, 30 and 42 for interconnecting the access panels 26 and 32, can be bundled together. Typically, the hoses 28, 30 and 42 are between 5 feet and 50 feet in length. Alternatively, quick disconnect male connectors can be used on both ends of the hoses and cables and appropriate auto-close female connectors located on vehicle access panel 32 and the off-board station access panel 26.

Typically, the sub-panels 27 and 29 are standardized. The sub-panels 27 and 29 of the present invention can include housing boxes, such as box 61 for enclosing gas and water sub-panel 27 and housing box 63 for enclosing electrical access panel 29. Electrical housing box 63 can house, in addition to switch 62, other electrical equipment, such as a cutout relay (not shown). Separate boxes house the gas and electrical connections, to avoid combustion of the gas due to stray sparking of electrical contacts. Typically, the panel boxes 61 and 63 include holes for wall mount. The boxes are preferably locked. The housing boxes 61 and 63 include glass panels 57 that can be broken in an emergency with a striking implement, such as one of the hammers 59, to provide emergency access to the gas valve 56, water valve 60 and to switch 62. The access panels 26, 32 can also include a telecommunication link, such as a telephone jack (not shown) for communication of information to another location, as is described in more detail below.

The off-board station 4 illustrated in FIGS. 1 through 4 can additionally include at least one communications link, such as a telephone link, and appropriate communication hardware and software, such as a programmed computer including a modem, for monitoring the status of the off-board station 4. Information transmitted over the communications line to a central or other location can include the security status (e.g., has the station been vandalized or otherwise rendered inoperative) of the off-board station 4. Other information can include the quantity of fuel, as measured by the fuel meter, delivered to each individual vehicle and the electrical power, as measured by the power meter, delivered for use off-board of the vehicle. A communication link can be established with a vehicle attached to the station 4 by which the vehicle is identified for accounting purposes. In such a manner, the operation of the station 4 can be monitored such that an accounting is made of the fuel consumed by and the electricity generated by a particular vehicle. Credits and debits can be automatically made to the credit card of a vehicle owner or user.

One of ordinary skill in the art, possessed of the teachings herein, can readily substitute alternate types of communication links for a telephone link. Other feasible forms of communicating links include conductive wires, optical fibers, coaxial cables, and transmission through free-space of electromagnetic energy such as radio waves, microwaves, or infrared beams. A telecommunication link can involve, for example, transmission to satellites, or to ground based stationary and/or mobile receivers. These techniques are well-known and oft employed by those skilled in the art of telecommunications for communicating signals, and are deemed to fall within the scope of the present invention.

As a more specific example of a telecommunications link that can be employed with the present invention, a weather-resistant housing is attached to the side of one of the boxes 61 and 63 enclosing the access panel 26. The housing contains a transceiver communication circuit and disposes an antenna of the circuit with a selected orientation for reliable communication with a remote transmitter or receiver. The weather-resistant housing can be formed with two mating portions, a base portion and a cover portion. A printed circuit board, having the communication circuit and the antenna fabricated on it, can mount to one portion. The system can include a support fitting for orienting the circuit board, and thus the antenna, to maximize broadcast and/or reception range. The cover portion is a radome, that is, it does not substantially impede the transmission of radio waves at the frequencies or frequency used by the transceiver.

Additionally, each off-board station 4 can serve as a refueling station for multiple-fuel cell electric vehicles.

Many of the fuel cells suitable for use in the present invention maintain their internal temperature at a sufficiently high level to effectively and efficiently generate electricity. In operation, the fuel cell typically generates considerable heat, and a circulating fluid, perhaps in combination with a moveable heat reflector shield, can be integrated into the design, as discussed in U.S. Pat. No. 5,332,630, issued Jul. 26, 1994 to Hsu, and which is herein incorporated by reference. However, during initial startup of a power cell system, the fuel cell may require heating. Accordingly, off-board station 4 can include structure for pre-heating the on-board fuel cell 10. For example, the inverter 24 can be reversed to rectify alternating current received from the utility grid. The rectified power can be supplied to the fuel cell 10 to warm or "start-up" the fuel cell. The off-board station 4 can also include a cutout relay to shut off power flow to the fuel cell 10 from the grid once the cell 10 is at or near its operating temperature and capable of providing electric power. The relay also connects the line 32 to the inverter 24 such that the fuel cell 10 delivers power to the grid. If the off-board station 4 provides power to a stand-alone user rather that to an electric utility grid, an auxiliary power unit, such as a diesel or gasoline generator, can be included with the off-board station 4 to provide power for pre-heating the fuel cell 10.

Alternatively, the fuel cell 10 can be pre-heated by circulating a heated fluid in the fuel cell 10 cooling system. Appropriate provision can be made at the off-board station 4 for heating a fluid and for delivery of the fluid to the fuel cell cooling system. Appropriate hoses and connectors can be provided at the access panels 26 and 32.

The fuel cell, if properly designed, can also be preheated by the heat generated by internally combusting fuel.

Figure 5:
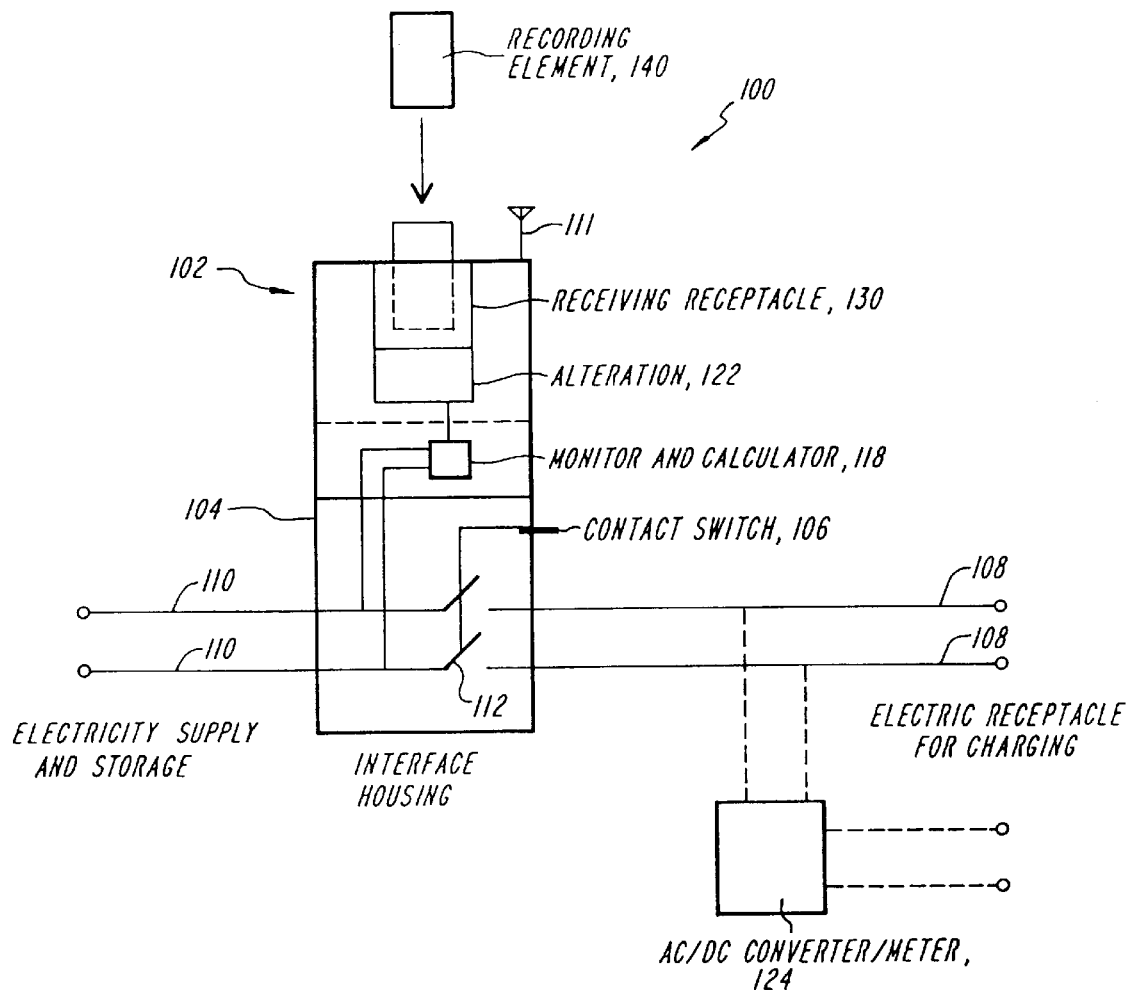
FIG. 5 is a schematic illustration of an electricity exchanging system for supplying electricity to or receiving electricity from a mobile vehicle power system in accordance with the teachings of the present invention.

The present invention also contemplates other embodiments of a facility or system, in addition to those described above, adapted for use in connection with the transfer of electricity between the mobile vehicle and the off-board system, such as the off-board station 4. Further adaptations and designs consistent with the teachings herein and readily apparent to one of ordinary skill are also encompassed by the present invention. For example, FIG. 5 illustrates an electricity exchanging system 100 for supporting the exchange of electricity between the system 100 and a mobile vehicle, such as the electric vehicle 2. For the sake of simplicity, the system 100 is described below in connection with its use with the electric vehicle 2, although those of ordinary skill will readily recognize that the system 100 can be used with any mobile vehicle or mobile vehicle power system.

The illustrated electricity exchanging system 100 can be mounted at any commercial or residential installation, and is preferably adapted for relatively easy electrical connection with a suitable electrical lead of the electric vehicle 2. In particular, the electricity exchanging system 100 can be mounted at a fixed, stationary site, such as along one or more positions of a utility power network or grid, at a stand alone generator or other stationary establishment, or can form part of or is mounted on a mobile generator, such as a battery or fuel cell powered vehicle.

The illustrated electricity exchanging system 100 is configured for direct electrical connection to a portion of the vehicle, such as the vehicle access panel 32, shown in FIG. 1. The electrical line 28 illustrated in FIG. 1 is of the quick interconnect type, and can be adapted for easy and relatively quick connection to the electrical leads 108 of the exchanging system 100. Hence, the system 100 accommodates and promotes relatively easy access to a power storage or supply facility for storing electricity generated by the electric vehicle, or to an electricity power supply for supplying electricity to the electric vehicle.

The electricity exchanging system 100 also includes an interface exchange facility 102 that has an interface housing 104. The housing 104 is selectively adapted for mounting suitable electrical connections, such as the illustrated input electric leads or receptacles 108, for connection to mating electric leads, such as the electrical lead 28 of the electric vehicle 2. The housing 104 further includes a contact switch 106, electrically coupled to the leads 108, 110, for selectively placing the input electric leads 108 in electrical communication with the output electrical leads 110. Specifically, the contact switch 106 can be actuated, such as by a system user or by a control sub-system, to actuate mechanical switches 112. The switches 112 can be positioned in a closed position for placing the electrical leads 108 in electrical communication with the output leads 110. The switches can also be positioned in an open position for disconnecting the output electrical leads 110 from the input electric leads 108. When actuated, the contact switch 106 and associated switches 112 allow the electric vehicle to transfer off-board electricity generated on-board the electric vehicle, or conversely allows the system 100 to supply electricity to the vehicle 2. A converter 124 can be provided to convert electricity between alternating current and direct current, depending upon use. For example, the converter 124 can convert dc electricity generated by the fuel cell 10 into alternating current electricity for subsequent supply to a utility grid. The converter can be coupled to the input electrical leads 108 for transferring the electricity, through the switches 112, to the output electrical leads 110.

One or more of the contact switch 106 and the switches 112 can be a mechanical switch, a solid state switch, or any other appropriate switch used to either actuate or connect together multiple system components.

The electricity exchanging system 100 can either store or receive for use electric power at the exchanging system site, or at a remote facility that is electrically connected to the output leads 110. As will be readily apparent to one of ordinary skill, the electric energy or power supplied to the electric vehicle can be generated, stored or received for use on site, or can be supplied from a remote site through the electricity exchanging system 100 to the electric vehicle.

With further reference to FIG. 5, the illustrated exchange facility 102 includes a receiving receptacle 130 sized and dimensioned for receiving a user authorization element. The user authorization element includes any element that grants or allows a user access to a selected facility or system, such as the electricity exchanging system 100 of the invention. The user authorization element can be a portable authorization element, such as a portable recording or memory element 140 of a type suitable for carrying by the system user. The memory element 140 can be a standard credit card sized portable memory element that has recorded or stored thereon (or is capable of having stored or recorded thereon) selected information associated with the transfer of electricity between the vehicle 2 and the electricity exchanging system 100. The user authorization element is also intended to include credit cards, smart cards, and other like cards that employ a memory element for storing selected information.

Recording elements of this type are known and well characterized in the art, and need not be described further herein. Other authorization elements are also contemplated by the present invention and can include cards that are free of memory. According to one practice, the user authorization element is a portable memory element 140, such as a smart card or credit card.

The receiving receptacle 130 can employ any selected mechanical and electrical assemblies that allow for the reading of recorded information from the memory element 140, or to write or update information stored on the recording element 140. For instance, the recording element 140 includes a storage element, such as a magnetic stripe, adapted for storing selected information, such as monetary values, that enables the system user to either purchase electricity supplied to the electric vehicle through the electricity exchanging system 100, or to sell electricity generated on-board the vehicle to the exchanging system 100.

The illustrated facility 102 further employs an alteration stage or device 122 that alters the information stored on the memory element 140, when positioned within the receiving receptacle 130, as a function of the type of electrical operation performed at the electricity exchanging system 100. The alteration stage 122 is further coupled to a monitor and calculation stage 118, which is in turn positioned to receive electrical information from the leads 108 or 110. The calculation stage 118 stores one or more conversion factors for transforming a first set of information into a second different set of information. For example, the calculation stage 118 can transform information, such as values or amounts associated with the quantity of electricity transferred between the system 100 and the vehicle 2, into monetary values. The monetary values can be recorded in a selected manner on the memory element 140 by the alteration stage 122. For example, the illustrated calculation stage 118 is positioned between the electrical leads 108 and 110 and the alteration stage 122 to convert a value(s) associated with the quantity of electricity supplied to or received from the electricity exchanging system 100 into a monetary value. The calculation stage 118 employs any associated processor and storage memory to store one or more conversion factor or rate that allows for the precise and real time conversion of electricity amounts into monetary values. The ordinarily skilled artisan can readily appreciate the components that comprise the alteration and converter stages, since the stages are generally known and well characterized in the art. Those of ordinary skill will also recognize that the monitor and calculation stage 118 or the alteration stage 122 can be remotely placed from the housing 114, and coupled thereto by any appropriate communication link. The monitor and calculation stage can be any processor-based system configured for calculating, converting or transforming information into monetary values. The electricity exchanging system 100 can also be constructed to store selected information, such as the monetary values, in storage (e.g., RAM, ROM, EPROM, EEPROM, magnetic tape, hard disk, floppy disk, and the like) located at the facility 102 or remotely placed therefrom, rather than in storage provided on the user authorization element.

According to another embodiment, the converter 124 can employ or be constructed as a power or electrical meter to monitor the flow of electricity to and/or from the electricity exchanging system 100. The meter can thus be adapted to monitor the bi-directional flow of electricity therethrough. The meter is able to detect the direction of electricity flow when electricity is either supplied to the vehicle or received from the vehicle by detecting the phase relationship between the AC voltage and the dc current, as is known. The meter can be a commercially available power meter, such as those produced by Schlumberger, U.S.A., and can be employed with a pair of current transformers in order to monitor current flow in each direction. Likewise, the meter 22, FIG. 1, can monitor the bi-directional flow of electricity therethrough.

The system 100 can also include a communication link 111 for transmitting or receiving selected information concerning the system or the operation of the system 100. For example, the communication link 111 can be a telephone link, and appropriate communication hardware and software, such as a programmed computer including a modem, can be mounted at the system location for monitoring the system status. Information associated with the use of the system can be transmitted over a communications line to a central or other location. Information of this type can include security status, frequency of use, amount of electricity as measured by any associated power meter supplied by the system or received by the system, amount of money processed by the station, and the status of selected operating components, as well as other information. A communication link can be established with a mobile vehicle coupled to the system 100 by which the vehicle is identified for accounting/status/security purposes. In such a manner, the operation of the system 100 can be monitored such that an accounting is made of the power supplied or received by the system.

One of ordinary skill in the art in light of the teachings herein can readily substitute alternate types of communication links for a telephone link. Other feasible forms of communicating links include conductive wires, optical fibers, coaxial cables, and trans mission through free-space of electromagnetic energy such as radio waves, microwaves, or infrared beams. A telecommunication link can involve, for example, transmission to satellites, or to ground based stationary and/or mobile receivers. Such transmission techniques are well known and oft employed by those skilled in the art of telecommunications for communicating signals, and are deemed to fall within the scope of the present invention.

In operation, a vehicle operator desirous of selling electricity to the electricity exchanging system 100 positions the electric vehicle 2 sufficiently close to the electricity exchange facility 102 so as to effect the exchange of electricity therebetween. The operator then places the portable memory element 140 into the receiving receptacle 130 of the housing 104. The operator then connects an electrical lead, such as electrical line 28 of the vehicle 2, to the input electrical leads 108, and then actuates the contact switch 106. The switch then moves from the normally open mechanical switches 112 into the closed position to electrically connect the input leads 108 with the output leads 110. The electric vehicle 2 then supplies or downloads off-board of the electric vehicle a selected quantity of on-board generated electricity to the electricity exchanging system 100. The amount of electricity supplied to the electricity exchanging system 100 is monitored by the monitor and calculation stage 118 or other suitable electronics. The calculation stage 118 transforms or converts the value associated with the amount of electricity supplied to the system 100 from the vehicle into a corresponding or associated monetary value, based on a predetermined conversion factor. The calculation stage 118 in turn actuates the alteration device 122 to alter the monetary values stored on the recording element 140 to represent or reflect the amount of electricity sold to the exchange facility 102. This is performed by adding to, incrementing, crediting or changing the monetary value p re-stored in the memory portion of the portable memory element to reflect the sale of electricity.

Conversely, if the operator desires to purchase electricity from the electricity exchanging system 100 for supply to the electric vehicle 2, a similar process is performed. For example, the operator positions the memory element 140 into the receiving receptacle 130 of the exchange facility 102, connects electrical line 28 to the input electrical leads 108, and then actuates the contact switch 106. The contact switch 106 places the switches 112 into the closed position, thus placing the output electrical leads into electrical communication with the input leads 108. The electricity exchanging system 100 then supplies electricity from a suitable local or remote power source to the output electrical leads 110. The output leads communicate the electricity to the input electrical leads 108 for subsequent transfer to the electric vehicle 2. The amount of electricity transferred through the electricity exchanging system 100 to the electric vehicle 2 is monitored by the calculation stage 118, which converts the quantity or amount of electricity supplied to the vehicle into a corresponding monetary value. This value is then transferred to the alteration facility 122, which in turn alters or updates the information recorded on the recording element 140 to reflect this uploading or purchase of electricity. This is performed by subtracting, decrementing, debiting or changing the monetary value pre-stored in the memory portion of the portable memory element to reflect the purchase of electricity.

Hence, the portable memory element functions as either a portable credit or debit recording element that allows a vehicle operator to sell electricity to the electricity exchanging system 100, or purchase electricity therefrom for the electric vehicle 2. For example, the alteration facility 122 can alter the information recorded on the memory element 140 to represent the sale of electricity to the system 100, by altering a monetary value stored on the recording element 140 to represent the sale of a selected quantity of electricity to the system 100 based on known conversion rates. Alternatively, the alteration facility 122 can alter the values stored on the recording element 140 by decreasing, decrementing or debiting selected values, such as monetary values, from the recording element as a function of the amount of electricity purchased from the electricity exchanging system 100 for use by the electric vehicle 2.

A significant advantage of employing an electricity exchanging system 100 in accordance with the features of the present invention is that it can be relatively easily positioned and mounted for allowing an electric vehicle operator to download electricity at a selected location (e.g., site). The electricity exchanging system 100 provides the electric vehicle operator with a compact and relatively easily usable facility that is disposed at multiple and easily accessible locations for bi-directionally exchanging electricity with the vehicle. Facilities of this type can be easily installed at multiple locations to create a substantially continuous or systematically staggered power support infrastructure that provides the electric vehicles with a dependable and easily accessible source of power, thereby allowing the vehicle to travel freely throughout a selected region.

Another significant advantage of the present invention is that it allows a vehicle operator to sell or purchase electricity by using an easily transportable recording device, such as the memory element 140. The memory element can be used to record, monitor or memorize the purchase or sale of electricity at the site of the electricity exchanging system 100.

Moreover, the illustrated electricity exchanging system 100 further affords for a convenient facility for supplying power to an electric vehicle. Those of ordinary skill will readily recognize that irregular charging needs occur during the use of electric vehicles, and generally occur at random unpredictable locations. Hence, the installation and use of the illustrated electricity exchanging system 100 provides for a convenient network of selectedly located exchange facilities that allows an electric vehicle operator to purchase electricity without concern about accidentally running out of electricity or energy. Moreover, the same facilities affords the operator the opportunity to download electricity off-board of the vehicle. The energy off loaded from the vehicle 2 can be sold to a distribution system coupled to the exchanging system 100.

Those of ordinary skill will also recognize that other additional types of transaction mediums can be employed to indicate the purchase or sale of electricity at the electricity exchanging system 100. For example, the facility 102 can be coin operated, and hence can be configured to accept any general currency to enable the purchase of electricity from the electricity exchanging system 100. Conversely, the vehicle operator or user can supply electricity for sale. The system 100 can provide a seller of electricity with a coupon, token or cash to indicate the sale of electricity at the site of the electricity exchanging system 100.

Figure 6:
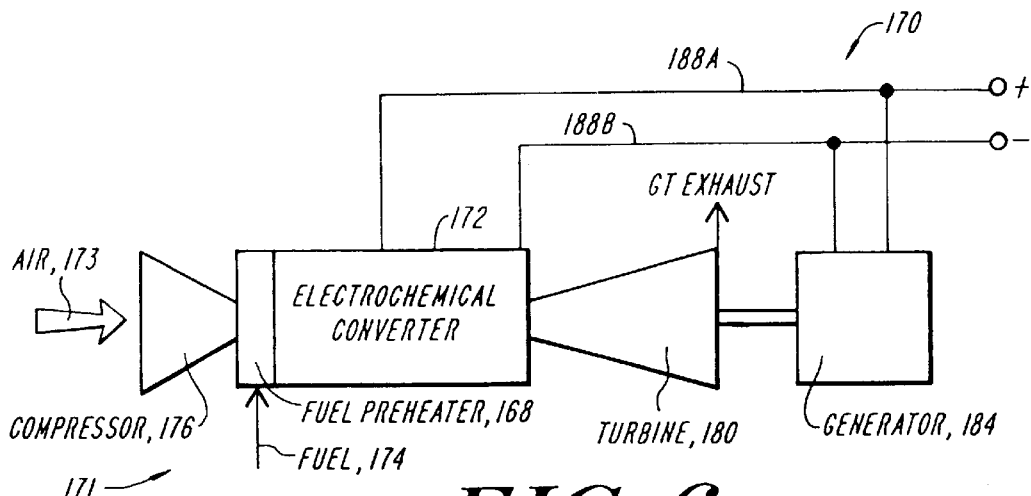
FIG. 6 is a schematic block diagram of a hybrid power system suitable for powering a mobile vehicle employing an electrochemical converter serially in-line with a gas turbine according to the teachings of the present invention.

The mobile vehicle of the present invention can employ a mobile vehicle power system that includes traditional power systems as well as hybrid power sources or generators. FIG. 6 shows one example of a hybrid power source or generator design that couples a fuel cell 172 with a gas turbine assembly 171. According to one aspect of the invention, the illustrated hybrid gas turbine power system 170 is an in-line gas turbine power system 170 that can be mounted in the mobile vehicle, such as for example in a vehicle similar to the vehicle illustrated in FIG. 1, as a primary power source. The illustrated gas turbine power system 170 includes an electrochemical converter 172 and a gas turbine assembly 171. The gas turbine assembly 171 comprises a compressor 176, a turbine 180, and a generator 184. Air from air source 173 is introduced to the compressor 176 by way of any suitable conduit where it is compressed, heated, and then discharged, and subsequently introduced to the electrochemical converter 172. Those of ordinary skill will readily recognize that the compressed air can be directly introduced to the converter or can be passed through an intermediate structure, such as a preheater 168, where it is preheated to a selected elevated temperature below the converter operating temperature. The heated air and fuel function as input reactants and power the electrochemical converter 172.

The converter 172 heats the compressed air introduced by the compressor 176 and the fuel 174 to produce high temperature exhaust. The exhaust is introduced to the gas turbine 180, which converts this thermal energy into rotary energy, for subsequent transfer to an electric generator 184. The generator 184 produces electricity that can be used for both commercial and residential purposes. One benefit of utilizing the electrochemical converter as the gas turbine combustor is that the converter functions as an additional electric generator. The illustrated electrical connections 188A and 188B show that electricity can be extracted from both the generator 184 and the converter 172. The gas turbine components and generator are art known and commercially available. Those of ordinary skill will readily understand the integration of the electrochemical converter and the gas turbine, especially in light of the present description and illustrations.

Figure 7:
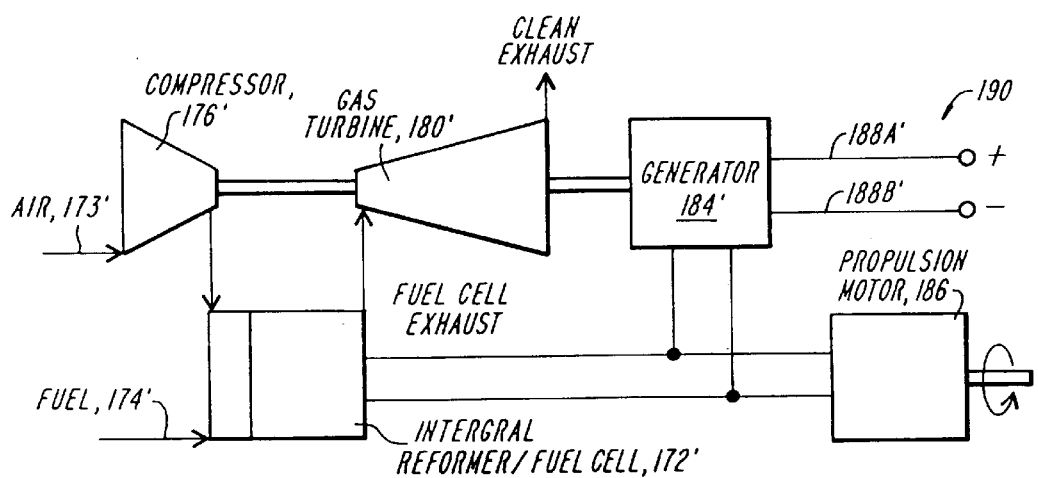
FIG. 7 is a schematic block diagram of an alternate embodiment of a hybrid power system suitable for powering a mobile vehicle employing an electrochemical converter out of line with a gas turbine according to the teachings of the present invention.

FIG. 7 illustrates a power system 190 where the electrochemical converter 172' is coupled off-line from the gas turbine. Air from the air source 173' is compressed by the compressor 176', discharged, and then introduced to the off-line converter 172'. Fuel from a fuel source 174' is introduced to the converter and the air and fuel are consumed thereby. The converter thermally disassociates the fuel into constituent non-complex reaction species, typically $H_2$ and CO, and creates high temperature exhaust. The exhaust is introduced to the gas turbine 180' which is coupled to the electric generator 184'. The illustrated generator 184' and converter 172' can be used to power the illustrated propulsion motor 186. The system 190 can further employ a preheater, similar to the preheater of FIG. 1, to preheat the reactants prior to introduction to the converter 172'.

Figure 8:
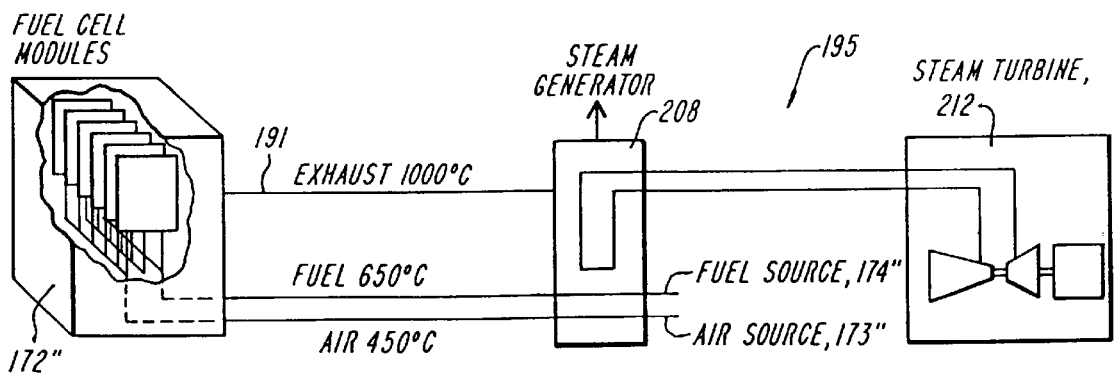
FIG. 8 is a schematic block diagram of another alternate embodiment of a hybrid power system suitable for powering a mobile vehicle employing an electrochemical converter and a steam turbine according to the teachings of the present invention.

FIG. 8 illustrates a power system 95 that employs an electrochemical converter 172", a heat recovery steam generator 208 (HRSG), and a steam turbine 212, connected as shown. The steam generator 208 functions as a preheater by preheating the input reactants, e.g., air and fuel, to a desirable elevated temperature below the operating temperature of the converter 172". The converter utilizes the input reactants and creates waste heat and heated exhaust 191. The exhaust 191 can be conveyed to the steam generator 208 by any suitable means, such as a conduit. The heated exhaust helps preheat the reactants 173", 174" by a regenerative heat exchange process, while concomitantly heating working medium associated with the steam turbine, such as water, to produce steam for the steam turbine 212. In an alternate embodiment, the steam generator 208 includes internally a reformer for reforming fuel by thermal disassociation, which typically involves the reformation of hydrocarbons and reforming agents into non-complex reaction species.

Figure 9:
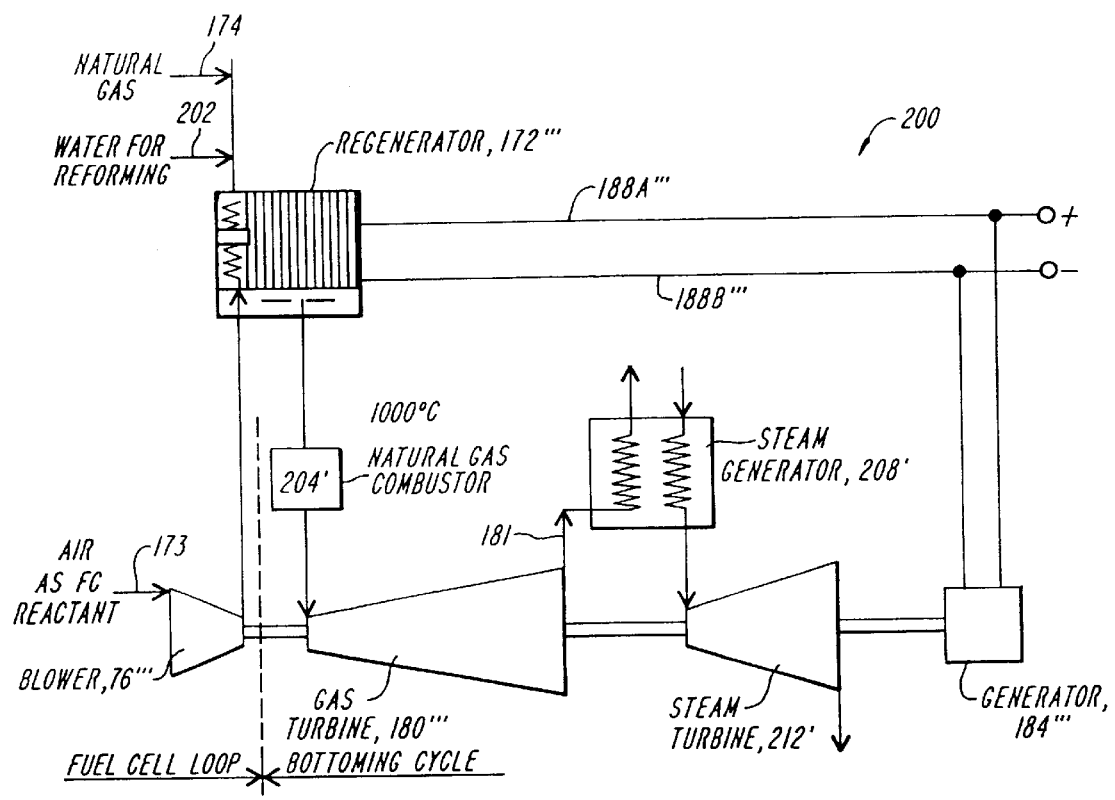
FIG. 9 is a schematic block diagram of yet another embodiment of a hybrid power system suitable for powering a mobile vehicle employing both a gas turbine, a steam turbine, and a converter exhaust heating element according to the teachings of the present invention.

FIG. 9 shows an alternate power system 200 that utilizes an electrochemical converter 72''', a gas turbine 80''', and a steam turbine 212'. Like reference numerals depict like parts with a selected prime, such as a single or triple prime. The illustrated power system 200 includes, in addition to the above-listed system components, a secondary combustor 204, a steam generator 208', and a steam turbine 212'. Fuel from a fuel source 174 and water 202 for reforming, generally supplied by a fluid reservoir (not shown), are introduced to the electrochemical converter 172'''. The water 202 and the waste heat produced by the converter 172''' help reform the input fuel, e.g., fossil fuel, into usable non-complex reaction species, e.g., molecular hydrogen and carbon monoxide. Air from the air source 173 is preferably introduced to the converter 172''' by way of the compressor or blower 176" and combines with the input fuel to power the converter 172'''. The converter 172''' produces a high temperature exhaust, typically around 1000° C., which is further heated to a selected elevated temperature, e.g., 1300° C., by the secondary combustor 204 to match the predetermined inlet temperature requirements of the gas turbine 180'''. The gas turbine produces an exhaust output 181 which is passed through a heat recovery steam generator 208' for subsequent use with the bottoming steam turbine 212'. The steam turbine output is coupled to the electric generator 184''' which produces electricity. Electrical connections 188A''' and 188B''' indicate that electricity can be directly extracted from both the electrochemical converter 172''' and the generator 184'''.

The illustrated power systems of FIGS. 6 through 9 provide the advantage in that they allow electricity to be produced in a high efficiency system by the direct integration of a high efficiency, compact electrochemical converter with the bottoming plant constituent components. The integration of the electrochemical converter with a gas turbine in the manner illustrated in FIGS. 6 through 9 produces a gas turbine power system that has an overall power efficiency of about 70%. This system efficiency represents a significant increase over the efficiencies achieved by prior art gas turbine systems and prior art electrochemical systems. The illustrated gas turbine power systems incorporate an electrochemical converter to provide high grade thermal energy and electricity, while utilizing the benefits of electrochemical converters. For example, the converter operates as a low NOx thermal source, thereby improving environmental performance relative to conventional gas turbine generating plants.

Figure 10:
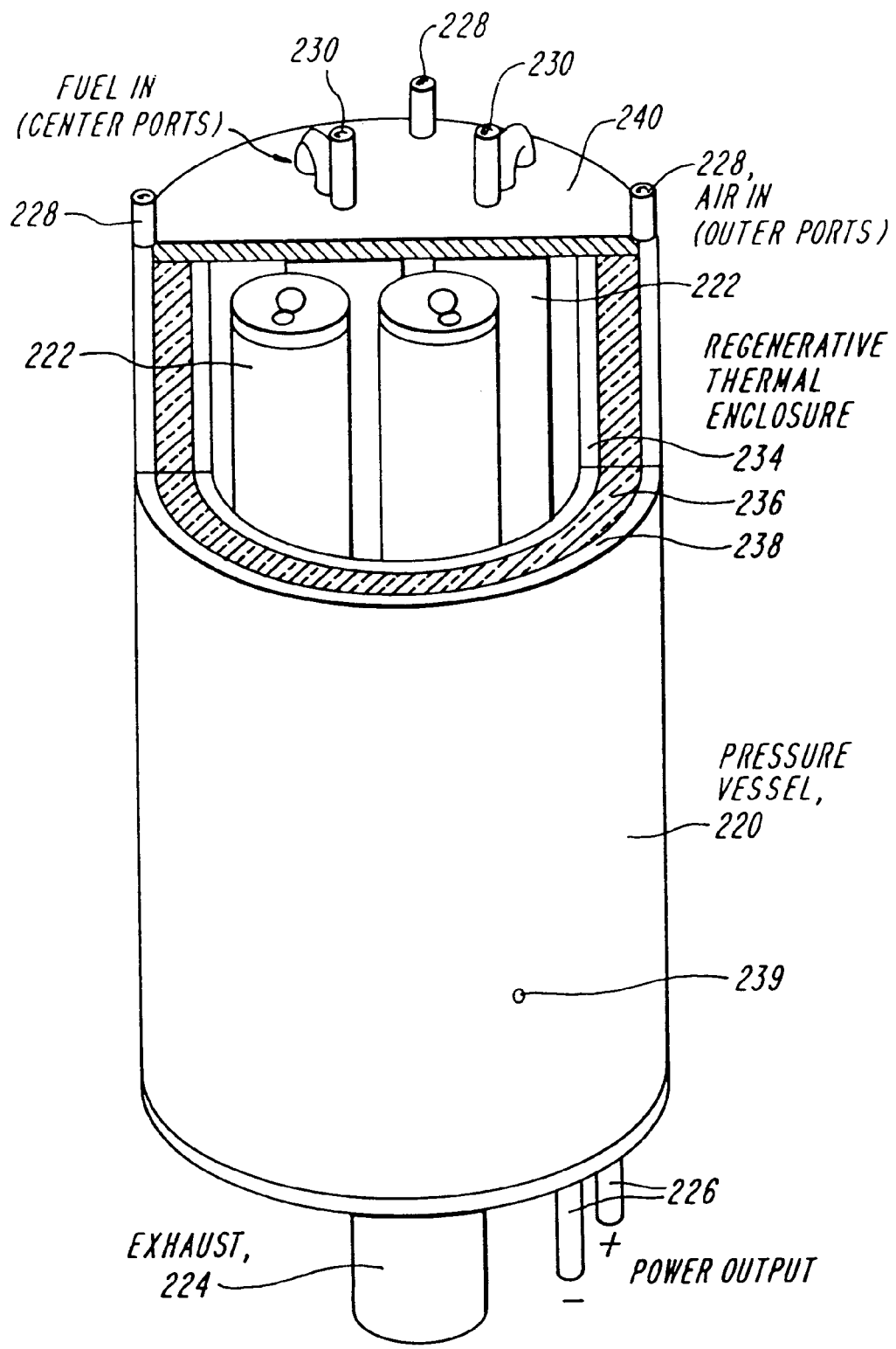
FIG. 10 is a plan view, partially cut-away, of a pressure vessel enclosing a series of electrochemical converters according to the teachings of the present invention.

According to the invention, the integration of an electrochemical converter with a bottoming device, such as the gas turbine illustrated in FIGS. 6 and 7, is aided by housing the electrochemical converter 172 within a pressure vessel. A preferred type of converter pressure vessel is illustrated in FIG. 10, where a pressure vessel 220, which can also function as a regenerative thermal enclosure, encases a series or array of fuel cell stacks or assemblies 222. The fuel cell stack 222 can comprise one or more of the electrochemical converters 172, and any associated hardware, such as a cooling assembly, heat exchanging assembly such as a regenerative heat exchanger, and the like. The pressure vessel 220 includes an exhaust outlet manifold 224 for routing gases collected by the pressure vessel 220 to a bottoming device, which can include any other power source or generator, and includes but is not limited to a gas turbine, a steam turbine, a motor, another fuel cell, a battery, and the like. The pressure vessel 220 also includes electrical connectors 226 and input reactant manifolds 228 and 230. In a preferred embodiment, the fuel reactant is introduced to the fuel cell stacks 222 through the centrally located manifolds 230, and the oxidizer reactant is introduced through the manifolds 228 located about the periphery of the vessel 220.

The fuel cell stack 222 can vent exhaust gases to the interior of the pressure vessel 220. The pressure of exhaust gases appropriate to the bottoming device used in conjunction with the pressure vessel can be controlled through use of a pump, such as the compressor 76 in FIG. 6 or a blower, for selectively pumping an input reactant into, and hence exhaust gases out of, the fuel cell stack 222.

As described above, the electrochemical converter 172 can be operated at an elevated temperature and at ambient pressure or slightly above, as when the energy system employs an HVAC system as the bottoming device, or at an elevated pressure, as when the energy system employs a gas turbine, and wherein the pressure vessel and electrochemical converter acts as the combustor of the gas turbine system. The electrochemical converter is preferably a fuel cell system that can also include an interdigitated heat exchanger, similar to the type shown and described in U.S. Pat. No. 4,853,100, which is herein incorporated by reference.

The pressure vessel 220 can include an outer wall 238 spaced from an inner wall 234, thereby creating an annulus 236 therebetween. The annulus 236 can be filled with an insulative material for maintaining the outer surface 239 of the pressure vessel 220 at an appropriate temperature. Alternatively, the annulus can house or form a heat exchanging element for exchanging heat with the pressure vessel 220. In one embodiment of a heat exchanger, the annulus 236 and walls 234 and 238 can form a heat exchanging jacket for circulating a heat exchanging fluid therein. The heat exchanger formed by the walls 234 and 238 and the annulus 236 exchanges heat with the pressure vessel and helps maintain the outer surface 239 of the pressure vessel at an appropriate temperature. Of course the use of the annulus 236 as a cooling jacket does not preclude the additional use of an insulative material, located other than in the annulus 236, for reducing heat loss from the interior of the pressure vessel 220 or for also helping to maintain the outer surface 239 of the pressure vessel at an appropriate temperature.

In one embodiment of the invention, the heat exchanging fluid circulated in the pressure vessel heat exchanger, such as the cooling jacket formed by walls 234 and 238 and annulus 236, is an input reactant, such as the air input reactant flowing in the manifolds 238. In this embodiment, the manifolds 228 are essentially inlets that are in fluid communication with the portion of the annulus 236 adjacent the top 240 of the pressure vessel 220. Additional manifolding (not shown) fluidly connects the annulus 236 to the fuel cell stack 222 such that the air input reactant is properly introduced thereto. The preheating of the air input reactant by the cooling jacket formed by walls 234 and 238 and annulus 236 serves several purposes, including preheating the air input reactant to boost efficiency by regeneratively capturing waste heat, and cooling the outer surface 239 of the pressure vessel 220.

Fuel cells typically disassociate fuel by utilizing the chemical potential of selected fuel species, such as hydrogen or carbon monoxide molecules, to produce oxidized molecules in addition to electrical power. Since the cost of supplying molecular hydrogen or carbon monoxide is relatively higher than providing traditional fossil fuels, a fuel processing or reforming step can be utilized to convert the fossil fuels, such as coal and natural gas, to a reactant gas mixture high in hydrogen and carbon monoxide. Consequently, a fuel processor, either dedicated or disposed internally within the fuel cell, is employed to reform, by the use of steam, oxygen, or carbon dioxide (in an endothermic reaction), the fossil fuels into non-complex reactant gases.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. An interface electricity exchanging system suitable for exchanging electricity with an electric powered vehicle, said system comprising
    an interface housing having electrical coupling means for coupling to an electrical connection of the electric powered vehicle,
    a monitoring stage for monitoring the amount of electricity exchanged between the vehicle and the housing,
    a calculation stage for converting the amount of recorded electricity into a monetary value according to a predetermined conversion factor,
    receiving means formed in the housing for receiving a user authorization element, and
    storage for recording the exchange of electricity or fuel between the vehicle and the housing.

2. The electricity exchanging system of claim 1, wherein said user authorization element includes memory for recording the amount of electricity exchanged between the vehicle and the housing, and wherein said system further comprises an alteration stage for altering the monetary value stored in the memory of the user authorization element by an amount related to the value of the electricity exchanged between the housing and the vehicle.

3. The electricity exchanging system of claim 1, wherein said electrical coupling means further comprises means for coupling the housing to an electric vehicle mounting a fuel cell.

4. The electricity exchanging system of claim 1, wherein said electrical coupling means further comprises means for coupling the housing to an electric vehicle mounting at least one of a fuel cell, a battery, and a combustion engine, and a gas turbine with an electric generator.

5. The electricity exchanging system of claim 1, wherein said system further comprises means for receiving electricity from the electric powered vehicle.

6. The electricity exchanging system of claim 1, wherein said system further comprises means for supplying electricity to the electric powered vehicle.

7. The electricity exchanging system of claim 1, wherein said system further comprises means for determining the direction of the flow of electricity.

8. The electricity exchanging system of claim 2, wherein said alteration stage comprises means for decrementing a monetary value stored on the portable memory device in an amount related to an amount of electricity supplied to the electric powered vehicle when coupled to said coupling means.

9. The electricity exchanging system of claim 2, wherein said alteration stage comprises means for incrementing a monetary value stored on the portable memory device in an amount related to an amount of electricity supplied to the system by the electric powered vehicle when coupled together by said coupling means.

10. The electricity exchanging system of claim 1, wherein said electrical coupling means comprises an input electrical lead, and wherein said system further comprises an output electrical lead, and a switch coupled to said housing for selectively placing said input electrical lead into electrical communication with said output electrical lead.

11. A method for exchanging electricity between an interface electricity exchanging system and an electric powered vehicle, said method comprising the steps of
    recording the amount of electricity exchanged between the electric powered vehicle and the electricity exchanging system,
    converting the amount of recorded electricity into a monetary value according to a predetermined conversion factor,
    providing a housing adapted for receiving a portable memory element, the portable memory element capable of having a selected alterable monetary value recorded thereon, and
    altering the monetary value recorded on the portable memory element by an amount related to the amount of electricity exchanged between the electricity exchanging system and the vehicle.

12. The method of claim 11, further comprising the step of coupling an electrical connection of the electric powered vehicle to the housing.

13. The method of claim 11, further comprising the step of coupling the housing to an electric vehicle mounting a fuel cell.

14. The method of claim 11, further comprising the steps of coupling the housing to an electric vehicle mounting at least one of a fuel cell, a battery, and a combustion engine.

15. The method of claim 11, further comprising the step of receiving electricity from or supplying electricity to the electric powered vehicle.

16. The method of claim 11, further comprising the step of decrementing a monetary value stored on the portable memory device in an amount related to an amount of electricity supplied to the electric powered vehicle.

17. The method of claim 11, further comprising the step of incrementing a monetary value stored on the portable memory device in an amount related to an amount of electricity supplied to the system by the electric powered vehicle.

18. The method of claim 11, further comprising the step of selectively placing an input electrical lead into electrical communication with an output electrical lead to allow the transfer of electricity thereacross.

19. The method of claim 11, further comprising the steps of providing an input electrical lead and an output electrical lead, and providing a switch coupled to said housing for selectively placing said input electrical lead into electrical communication with said output electrical lead for allowing the transfer of electricity thereacross.

\* \* \* \* \*